US011068832B1

(12) United States Patent
Jonte et al.

(10) Patent No.: US 11,068,832 B1
(45) Date of Patent: Jul. 20, 2021

(54) SYSTEM AND METHOD FOR IDENTIFYING FREIGHT CAPACITY

(71) Applicant: Haul Street Solutions LLC, Kansas City, MO (US)

(72) Inventors: Josh Jonte, Zionsville, IN (US); Paul Schultz, St. Joseph, MO (US); Mark Hogan, Kansas City, MO (US)

(73) Assignee: VuTrans Solutions LLC, Weatherby Lake, MO (US)

( * ) Notice: Subject to any disclaimer, the term of this patent is extended or adjusted under 35 U.S.C. 154(b) by 163 days.

(21) Appl. No.: 16/552,490

(22) Filed: Aug. 27, 2019

Related U.S. Application Data

(60) Provisional application No. 62/725,772, filed on Aug. 31, 2018.

(51) Int. Cl.
  *G06Q 10/08* (2012.01)
  *G06Q 10/06* (2012.01)

(52) U.S. Cl.
  CPC ..... *G06Q 10/083* (2013.01); *G06Q 10/06312* (2013.01)

(58) Field of Classification Search
  CPC .... G06Q 10/083; G06Q 10/08; G06Q 10/047; G06Q 50/30; G06Q 10/1097; G06Q 10/0834; G06Q 10/08355; G06Q 50/28; G06Q 10/06311
  See application file for complete search history.

(56) References Cited

U.S. PATENT DOCUMENTS

| | | | | | |
|---|---|---|---|---|---|
| 5,157,714 | A | * | 10/1992 | Spicer | H04M 3/493 379/142.01 |
| 5,265,006 | A | * | 11/1993 | Asthana | G06Q 10/06 705/7.26 |
| 5,835,376 | A | * | 11/1998 | Smith | G08G 1/202 701/117 |
| 5,835,716 | A | * | 11/1998 | Hunt | G06Q 10/02 709/213 |

(Continued)

OTHER PUBLICATIONS

Yang, Jian et al., On-Line Algorithms for Truck Fleet Assignment and Scheduling under Real-Time Information, University of Texas, Jul. 1998 (Year: 1998).*

(Continued)

*Primary Examiner* — Scott L Jarrett
(74) *Attorney, Agent, or Firm* — Fresh IP PLC; John R. Bednarz

(57) ABSTRACT

A system includes a memory and at least one processor to determine a location of each vehicle of a plurality of vehicles that have freight capacity, determine a distance of each vehicle to a location of each uncovered shipment of a plurality of uncovered shipments, determine an estimated time of arrival for each vehicle to arrive at the location of each uncovered shipment of the plurality of uncovered shipments, determine a particular vehicle of the plurality of vehicles having a highest score that is selected to service a particular uncovered shipment of the plurality of uncovered shipments, the highest score based on the distance, the estimated time of arrival, and a pick up time for the particular uncovered shipment, and transmit a notification to a computing device of an operator of the particular vehicle that indicates that the particular vehicle is selected to service the particular uncovered shipment.

18 Claims, 5 Drawing Sheets

(56) References Cited

U.S. PATENT DOCUMENTS

| | | | | |
|---|---|---|---|---|
| 5,880,958 | A * | 3/1999 | Helms | G08G 1/202 701/117 |
| 6,219,653 | B1 * | 4/2001 | O'Neill | G06Q 10/08 705/29 |
| 6,240,362 | B1 * | 5/2001 | Gaspard, II | G01C 21/343 340/991 |
| 6,385,537 | B2 * | 5/2002 | Gaspard, II | G01C 21/343 340/991 |
| 6,510,383 | B1 * | 1/2003 | Jones | G01C 21/343 340/993 |
| 6,701,299 | B2 * | 3/2004 | Kraisser | G06Q 10/0631 705/7.12 |
| 7,222,081 | B1 * | 5/2007 | Sone | G06Q 10/08 705/333 |
| 7,243,074 | B1 * | 7/2007 | Pennisi, Jr. | G06Q 10/06312 705/7.22 |
| 7,313,530 | B2 * | 12/2007 | Smith | G06Q 10/04 705/7.24 |
| 7,353,181 | B2 * | 4/2008 | Nel | G06Q 10/08 705/7.22 |
| 7,385,529 | B2 * | 6/2008 | Hersh | G06Q 10/06311 340/988 |
| 7,949,612 | B2 * | 5/2011 | Davis, III | G06Q 10/0631 705/336 |
| 8,386,177 | B2 * | 2/2013 | Wu | G06Q 10/06 701/519 |
| 8,452,713 | B2 * | 5/2013 | Stemple | G06Q 10/083 705/333 |
| 9,082,144 | B2 * | 7/2015 | Jones | H04W 4/029 |
| 9,571,983 | B1 * | 2/2017 | Li | H04W 4/029 |
| 9,602,961 | B2 * | 3/2017 | Smyrk | G06Q 10/08 |
| 10,142,255 | B1 * | 11/2018 | Pachon | G06Q 10/0631 |
| 10,198,704 | B2 * | 2/2019 | Myers | G06F 16/951 |
| 10,217,069 | B2 * | 2/2019 | Scicluna | G06Q 50/30 |
| 10,395,209 | B2 * | 8/2019 | Moskos | G06Q 10/0833 |
| 10,565,543 | B1 * | 2/2020 | Mo | G06N 3/08 |
| 10,776,748 | B2 * | 9/2020 | Jones | G06Q 30/08 |
| 10,896,397 | B1 * | 1/2021 | VanEaton | G06Q 10/06311 |
| 10,896,401 | B2 * | 1/2021 | Berdinis | G06Q 10/08345 |
| 10,922,746 | B2 * | 2/2021 | Rackley, III | G06Q 30/0631 |
| 10,930,157 | B2 * | 2/2021 | Spector | G06Q 10/06316 |
| 2002/0019759 | A1 * | 2/2002 | Arunapuram | G06Q 10/04 705/7.26 |
| 2002/0077876 | A1 * | 6/2002 | O'Meara | G06Q 10/06316 705/7.15 |
| 2003/0004769 | A1 * | 1/2003 | Soga | G06Q 10/0633 705/7.11 |
| 2003/0036935 | A1 * | 2/2003 | Nel | G06Q 10/08 705/7.22 |
| 2003/0046133 | A1 * | 3/2003 | Morley | G06Q 10/0639 705/7.12 |
| 2004/0039527 | A1 * | 2/2004 | McDonald, Jr. | H04L 29/06 701/469 |
| 2004/0107110 | A1 * | 6/2004 | Gottlieb | G06Q 10/047 705/6 |
| 2004/0236502 | A1 * | 11/2004 | Nozaki | G08G 1/202 701/517 |
| 2006/0224426 | A1 * | 10/2006 | Goossens | G06Q 50/188 705/80 |
| 2008/0097812 | A1 * | 4/2008 | Davis | G06Q 10/0835 705/7.12 |
| 2010/0250446 | A1 * | 9/2010 | Mackenzie | G06Q 50/188 705/80 |
| 2012/0072109 | A1 * | 3/2012 | Waite | G01C 21/3484 701/431 |
| 2012/0209787 | A1 * | 8/2012 | Foulds | G06Q 10/083 705/333 |
| 2015/0006428 | A1 * | 1/2015 | Miller | G06Q 10/0835 705/336 |
| 2015/0032491 | A1 * | 1/2015 | Ulm, Sr. | G06Q 10/06311 705/7.13 |
| 2015/0081360 | A1 * | 3/2015 | Sun | G06Q 50/28 705/7.13 |
| 2015/0213402 | A1 * | 7/2015 | Stroner | G06Q 20/28 705/40 |
| 2016/0203440 | A1 * | 7/2016 | Burnett | G06Q 40/08 705/4 |
| 2016/0350701 | A1 * | 12/2016 | Brehm | G05D 1/0297 |
| 2017/0236088 | A1 * | 8/2017 | Rao | G06Q 10/063112 705/7.17 |
| 2018/0046964 | A1 * | 2/2018 | Leoni | G06Q 10/06315 |
| 2018/0165642 | A1 * | 6/2018 | Krieg | G06Q 50/28 |
| 2018/0211218 | A1 * | 7/2018 | Berdinis | G05D 1/0291 |
| 2018/0315319 | A1 * | 11/2018 | Spector | G06Q 10/06316 |
| 2018/0349849 | A1 * | 12/2018 | Jones | G06Q 30/0611 |
| 2019/0114583 | A1 * | 4/2019 | Ripert | G06Q 20/322 |
| 2019/0318298 | A1 * | 10/2019 | Driegert | G06Q 10/083 |

OTHER PUBLICATIONS

Computerized Vehicle Routing and Scheduling (CVRS) for Efficient Logistics UK Department of Transport, 2005 (Year: 2005).*

Vernas, Omer et al., Gap-based transit assignment problem with vehicle capacity constraints: Simulation-based implementation and large-scale application, Transportation Research Part B, vol. 93, 2016 (Year: 2016).*

Songhori, et al., A supplier selection and order allocation model with multiple transportation alternatives, Int. J. Adv. Manuf. Technol., May 7, 2010, DOI 10.1007/s00170-010-2697-0 (12 pages).

* cited by examiner

FIG. 4

SYSTEM AND METHOD FOR IDENTIFYING FREIGHT CAPACITY

CROSS-REFERENCE TO RELATED APPLICATION

This application claims priority under 35 U.S.C. § 119 to U.S. Patent Application No. 62/725,772, filed Aug. 31, 2018, entitled "System and Method for Identifying Freight Capacity," the entire contents of which are incorporated herein by reference.

BACKGROUND

More than fifty thousand U.S. Department of Transportation (DOT) licensed motor carrier trucking companies directly transport shipments of cargo over roads throughout the United States, between pick up origin locations and destination delivery locations, using trucks and other types of vehicles such as semi-tractor trailer rigs. There are also several thousand third party logistics companies (3PLs) who contract with motor carriers to arrange for the transport of property (freight/cargo) by motor carrier on behalf of hundreds of thousands of freight shippers and receivers, between numerous pick up origin locations and numerous delivery destination locations.

Recently, the U.S. Department of Transportation's Federal Motor Carrier Safety Administration reported that the vehicles traveled 279,800,000,000 miles annually while transporting freight throughout the United States. The freight transportation industry involves many variables that create significant challenges to shippers, receivers, motor carriers, drivers, and others to keep vehicles loaded and transporting the United States' more than twenty-two trillion pounds of freight annually. These twenty-two trillion pounds of freight represent a variety of different commodities, raw materials, and finished goods products. Hundreds of thousands of manufacturers, retailers, distributors, and other companies represent the source of the enormous amount of freight shipped throughout the United States annually.

The enormity and complexity associated with the growing freight transportation industry provide a number of challenges that have not been adequately solved and addressed. Unfortunately, there is a tremendous amount of inefficiency associated with the freight transportation industry. As an example, vehicle operators may waste fuel and time due to circumstances outside of their control. In many cases, vehicle operators and carriers do not know about potential opportunities and may unnecessarily idle and/or may travel "empty" (also known as deadhead miles or deadheading) from one location to another location without carrying a load.

The vehicle operators may travel irregular routes and make pick-up and delivery stops along a route that may change day-to-day and week-to-week. Some operators may go many months or years without running a same origin and destination route. In addition, many vehicle operators are compensated on a per mile basis and desire to be productive by hauling freight and not sitting idling (wasting time and fuel) while they wait for a next shipment pick up time or while they wait to unload an inefficiently scheduled delivery appointment. Unnecessary wait time and wasteful excessive empty miles (e.g., driving empty to a next pick up) utilize an operator's time and limit the amount of time the operator may be on duty each day.

It is with these issues in mind, among others, that various aspects of the disclosure were conceived.

SUMMARY

According to one aspect, a system for automatically identifying available vehicle capacity in need of one or more shipments to pick up and transport and also automatically identifying uncovered shipments may automatically match a particular vehicle having capacity to transport one or more shipments with one or more uncovered shipments of freight. The vehicle may be a driver operated motor vehicle or another type of vehicle. The system may include a server computing device that may perform a number of functions every few minutes to automatically match the particular vehicles having the available capacity with the particular shipments of freight. In one embodiment, the server computing device may assign the particular vehicle a highest score amongst a number of possible vehicles that could service the particular shipment of freight. In another embodiment, the server computing device may determine a score for each vehicle and rank the vehicles based on the score. In another embodiment, the server computing device may determine a score for each shipment and rank the shipments based on the score. The score may be based on a location of the particular vehicle, a location of the particular shipment of freight, an estimated amount of time for the particular vehicle to arrive at the location of the particular shipment of freight, a number of repositioning deadhead miles for each vehicle to travel from a current location to each uncovered shipment's pick up origin, a number of repositioning deadhead miles for each vehicle to travel from each delivery destination to each vehicle's next desired location, a freight hauling rate considered acceptable for each vehicle, and a pick up time and/or a pick up window for the particular shipment of freight. In addition, the score may be based on qualities associated with the vehicle, e.g., the vehicle's viability and suitability to satisfy shipment specific requirements and qualities. As an example, the vehicle may be suitable for transporting hazardous materials or the vehicle is suitable for transporting frozen/perishable freight, among other examples.

The levels of available vehicle capacity versus the level of uncovered shipments can vary significantly day by day, state to state, and city to city, and so on. In addition, the availability of vehicles and a number of available shipments may fluctuate, sometimes rapidly and unpredictably based on seasons, weather (e.g., snowstorms, hurricanes), holidays, and other reasons.

According to an aspect, a system includes a memory and at least one processor to at a particular regular interval of time, determine a location of each vehicle of a plurality of vehicles that have freight capacity, determine a distance of each vehicle to a location of each uncovered shipment of a plurality of uncovered shipments, determine an estimated time of arrival for each vehicle to arrive at the location of each uncovered shipment of the plurality of uncovered shipments, determine a particular vehicle of the plurality of vehicles having a highest score that is selected to service a particular uncovered shipment of the plurality of uncovered shipments, the highest score based on the distance, the estimated time of arrival, and a pick up time for the particular uncovered shipment, and transmit a notification to a computing device of an operator of the particular vehicle that indicates that the particular vehicle is selected to service the particular uncovered shipment.

According to another aspect, a method includes at a particular regular interval of time, determining, by at least one processor, a location of each vehicle of a plurality of vehicles that have freight capacity, determining, by the at least one processor, a distance of each vehicle to a location of each uncovered shipment of a plurality of uncovered shipments, determining, by the at least one processor, an estimated time of arrival for each vehicle to arrive at the location of each uncovered shipment of the plurality of uncovered shipments, determining, by the at least one processor, a particular vehicle of the plurality of vehicles having a highest score that is selected to service a particular uncovered shipment of the plurality of uncovered shipments, the highest score based on the distance, the estimated time of arrival, and a pick up time for the particular uncovered shipment, and transmitting, by the at least one processor, a notification to a computing device of an operator of the particular vehicle that indicates that the particular vehicle is selected to service the particular uncovered shipment.

According to an additional aspect, a non-transitory computer-readable storage medium includes instructions stored thereon that, when executed by a computing device cause the computing device to perform operations, the operations including at a particular regular interval of time, determining a location of each vehicle of a plurality of vehicles that have freight capacity, determining a distance of each vehicle to a location of each uncovered shipment of a plurality of uncovered shipments, determining an estimated time of arrival for each vehicle to arrive at the location of each uncovered shipment of the plurality of uncovered shipments, determining a particular vehicle of the plurality of vehicles having a highest score that is selected to service a particular uncovered shipment of the plurality of uncovered shipments, the highest score based on the distance, the estimated time of arrival, and a pick up time for the particular uncovered shipment, and transmitting a notification to a computing device of an operator of the particular vehicle that indicates that the particular vehicle is selected to service the particular uncovered shipment.

These and other aspects, features, and benefits of the present disclosure will become apparent from the following detailed written description of the preferred embodiments and aspects taken in conjunction with the following drawings, although variations and modifications thereto may be effected without departing from the spirit and scope of the concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 4 illustrates an example notification provided by a freight capacity application of the system according to an example embodiment.

DETAILED DESCRIPTION

Figure 1:
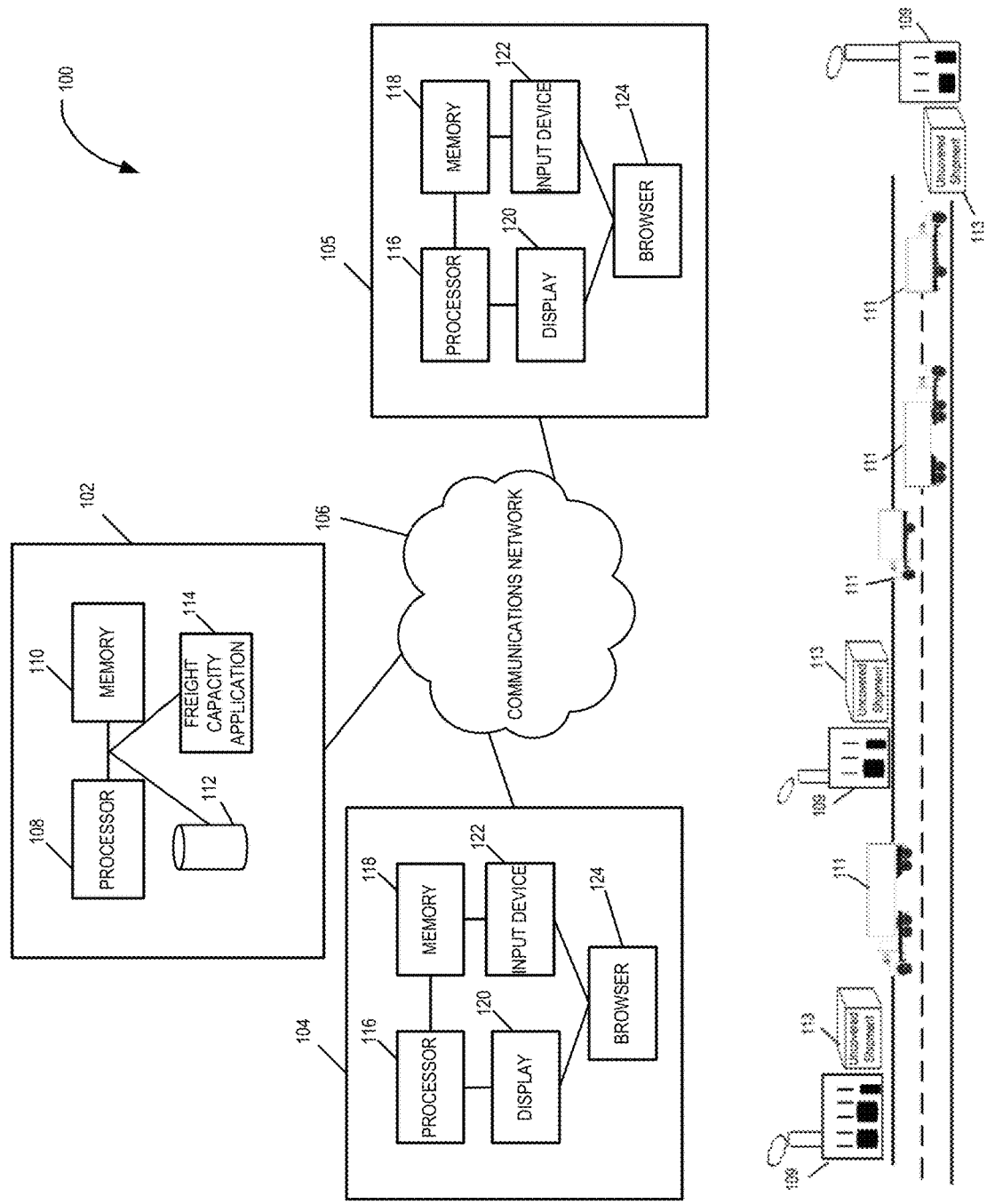
FIG. 1 is a block diagram of a system for identifying freight capacity according to an example embodiment.

Aspects of a system and method for identifying freight capacity and matching a vehicle with uncovered freight include a server computing device for determining and selecting a particular vehicle of a plurality of vehicles having freight capacity to cover an uncovered freight shipment. At a particular regular interval of time, the server computing device may determine a location of each vehicle of a plurality of vehicles that have freight capacity and each vehicle's viability and suitability to satisfy all of the shipment's specific requirements and qualities. Next, the server computing device may determine a distance of each vehicle determined to be both available and viable to a location of each uncovered shipment of a plurality of uncovered shipments and then determine an estimated time of arrival for each vehicle to arrive at the location of each uncovered shipment of the plurality of uncovered shipments. After determining the distances and estimated times of arrival, the server computing device may determine a particular vehicle of the plurality of vehicles having a highest score that is selected to service a particular uncovered shipment of the plurality of uncovered shipments, the highest score based on a number of repositioning deadhead miles for each vehicle to travel from their current location to each uncovered shipment's pick up origin, a number of repositioning miles for each vehicle to travel from each shipment's delivery destination location to each vehicle's next desired location, a freight hauling rate considered acceptable by each vehicle, and a pick up time/and or pickup window for the particular uncovered shipment.

In addition, the score may be based on qualities associated with the vehicle, e.g., the vehicle's viability and suitability to satisfy all of the shipment's specific requirements and qualities. Shipment qualities include the type of commodity being shipped and the nature of the commodity e.g., is the commodity hazardous thus requiring a hazardous materials certified vehicle and driver, or is the shipment perishable requiring a vehicle with refrigeration, or does the shipment have a high monetary value that may necessitate constant surveillance, and other qualities. Further, the score may be based on the distance, the estimated time of arrival, the requested pick up time and others for the particular uncovered shipment. Then, the server computing device may transmit a notification to a computing device of an operator of the particular vehicle that indicates that the particular vehicle is selected to service the particular uncovered shipment.

A system includes a memory and at least one processor to, at a particular regular interval of time, determine a location of each vehicle of a plurality of vehicles that have freight capacity, determine a distance of each vehicle to a location of each uncovered shipment of a plurality of uncovered shipments, determine an estimated time of arrival for each vehicle to arrive at the location of each uncovered shipment of the plurality of uncovered shipments, determine a viability of each vehicle to meet qualities associated with each uncovered shipment of the plurality of shipments, determine a particular vehicle of the plurality of vehicles having a highest score or minimum qualification score that is selected to service a particular uncovered shipment of the plurality of uncovered shipments, the highest score or the minimum qualifications score based on the distance, the estimated time of arrival, the relevance of a particular vehicle of a plurality of vehicles to meet the minimum qualities required by each shipment of a plurality of shipments, and a pick up time for the particular uncovered shipment, and transmit a notification to a computing device of an operator of the particular vehicle that indicates that the particular vehicle (that is determined to be viable) is selected to service the particular uncovered shipment. The system can receive a response from a particular operator of a vehicle or plurality of vehicles indicating the vehicle's acceptance, rejection, rate negotiation, or other conditions concerning the vehicle's selection to service a particular uncovered shipment.

The system may determine a score for each vehicle and rank the vehicles based on the score. The system also may determine a score for each shipment and rank the shipments based on the score.

The vehicle may be a driver operated motor vehicle or another type of vehicle. The server computing device may transmit information to a client computing device including notifications associated with a plurality of vehicles and freight carried by the vehicles and display a user interface including a dashboard that may display information associated with the plurality of vehicles and freight carried by the plurality of vehicles. The server computing device may transmit information to an operator computing device including notifications associated with a plurality of shipments uncovered and in need of available and viable vehicle capacity and display a user interface including a dashboard that may display information associated with the plurality of uncovered freight shipments offered by a plurality of clients in need of available and viable vehicle capacity.

The server computing device may utilize historical information, traffic information, weather information, manually entered data provided by an operator of the vehicle, global positioning system (GPS) information provided by vehicles, operator log information provided by operators, driver qualifications, specific vehicle qualifications, and cell tower location data associated with mobile computing devices of the operators to provide vehicle location information and estimated time of arrival information.

The system discussed herein enables shippers of freight to automatically and/or manually input uncovered shipment information into a database associated with the system. The system may automatically allow these uncovered shipments to be serviced by a plurality of carriers and operators of vehicles. These carriers and operators may be automatically selected by the system to provide freight capacity for the uncovered shipments. The system may evaluate a location of each currently available vehicle to cover an uncovered shipment. The system may also evaluate when an uncovered shipment is ready and available for pick up to select a particular vehicle to service and cover the uncovered shipment. The particular vehicle may be chosen based on a score that is associated with a current location of the vehicle, the location of the uncovered shipment, the relevance of a particular vehicle of a plurality of vehicles to meet the minimum qualities for each shipment of a plurality of shipments, and other factors. The system may determine a score for each vehicle and rank the vehicles based on the score. The system also may determine a score for each shipment and rank the shipments based on the score. Some vehicles may be in transit and other vehicles may be stationary. Thus, the system may have to continually update a score of each vehicle of the plurality of vehicles to select the particular vehicle that has a score that indicates that it is the best vehicle to cover the uncovered shipment.

The system discussed herein enables a plurality of carriers and operators of vehicles to automatically and/or manually input their vehicles that have available capacity to service a particular uncovered shipment of a plurality of shipments into a database associated with the system. The system may automatically allow these operators of vehicles with available capacity to service a plurality of clients and their uncovered shipments. These uncovered shipments may be automatically selected by the system to be offered to operators of vehicles with viable capacity. The system may evaluate a location of each currently uncovered shipment to make available to a plurality of vehicles with available capacity to service the uncovered shipment. The system may also evaluate when an available vehicle is ready and available to pick up and service a particular uncovered shipment and fill all or a portion of the available vehicle's available capacity. The particular uncovered shipment may be chosen based on a score that is associated with a current location of the vehicle, the location of the available vehicle, the relevance of a particular uncovered shipment of a plurality of uncovered shipments to meet the minimum qualities for each available vehicle of a plurality of available vehicles, and other factors. Some uncovered shipments may become covered during evaluation intervals when uncovered shipment scores are re-evaluated while other uncovered shipments may remain uncovered during evaluation intervals when uncovered shipment scores are re-evaluated. Thus, the system may have to continually update a score of each uncovered shipment of the plurality of uncovered shipments to select the particular uncovered shipment that has a score that indicates that it is the best uncovered shipment to be serviced by a particular available vehicle of a plurality of available vehicles.

In one example, a vehicle may be in transit and approaching the location of the uncovered shipment or the vehicle may be in transit and traveling away from the location of the uncovered shipment. The vehicle that is approaching the location of the uncovered shipment may also be carrying a shipment and still in route to the destination for that shipment. Once the vehicle arrives at the destination for that shipment and is unloaded, then the vehicle will be deemed available to cover the uncovered shipment. The vehicle also may be traveling to a fuel station to refuel or to a location for maintenance. In other words, at a first time, a vehicle may have a score of X, but at a second time, the vehicle may have a score of Y. This may indicate that the vehicle is approaching the location of the uncovered shipment or is traveling away from the location of the uncovered shipment. The score also may take into consideration whether the vehicle is still in the process of carrying a shipment and still in route to deliver the shipment to its destination, among other factors and variables.

Other factors and variables may be used to determine the score and analyze whether a vehicle is compatible and viable to transport freight or whether an uncovered shipment is compatible with viable vehicles with available capacity. The commodity that is being shipped may include a hazardous material in a quantity that requires that the vehicle be placarded as hazardous. Additionally, the commodity may be perishable and the vehicle may need a trailer that can maintain a particular temperature. In another example, the shipment may exceed length, height, width, or weight limits. In this case, a special trailer with a special permit may be used. In addition, the delivery destination may not have a standard height receiving dock. In this case, vehicles may have to be equipped with a mechanism such as a ramp or lift gate to be viable to transport the shipment. Other factors and variables are possible.

As an example, if the commodity(s) being shipped contains a hazardous material in a quantity or amount that requires (by federal regulation) that the truck or trailer be placarded as hazardous, then a hazardous materials certified vehicle and driver are required and therefore only a HazMat certified motor carrier and driver are viable sources of capacity for this type of shipment. As another example, if at least a portion of the shipment is perishable then an insulated and temperature controlled vehicle may be required. As a result, only straight trucks or trailers that are insulated and that can maintain a specific temperature setting (or range) may be viable for this type of shipment. As another example, if the requested delivery time is not attainable because a single driver is unable to arrive in time, a driver team (e.g., two drivers) may be required. As a result, only trucks or tractor-trailers with two person team drivers are considered viable for this type of shipment. As another example, if the shipment's dimensions exceed federal highway legal limits for length, height, width, or weight then only specialized deck trailers with the required special permits are to be considered as sources of viable capacity for this type of shipment. As another example, if the delivery destination does not have a standard height receiving dock, then a lift gate or ramp is required. As a result, only trucks or trailers with a ramp or lift gate are considered as viable sources of capacity for this type of shipment. As another example, the cargo may be "heavy" but not heavy enough to require overweight permits and a specialized multi-axle trailer. In that case, only trucks or tractor trailers that can scale the heavy shipment weight are considered to be viable capacity for this type of shipment and therefore listed by the system as a capacity solution for a specific shipment.

Once a vehicle is selected and matched to cover an uncovered shipment, the uncovered shipment is removed from the list of uncovered shipments that are available for any party which may include operators of vehicles, for shippers and/or their third party representatives (e.g., freight brokers, freight forwarders). In addition, the status of the vehicle selected to cover the uncovered shipment is modified. The system stores information in the database indicating that the vehicle is transporting the shipment, and may be unable to cover future uncovered shipments. When an available vehicle is selected and matched to cover an uncovered shipment and the selected vehicle accepts the offer to service the uncovered shipment, the no-longer-available vehicle is removed from the list of available vehicles that are available for shippers and/or their third-party representatives (e.g., freight brokers, freight forwarders). In addition, the status of the uncovered shipment selected and confirmed to be serviced by a vehicle is modified. The system stores information in the database indicating that the shipment may not be available to be covered by vehicles with available capacity.

In an embodiment, each operator, shipper, and third party representative may provide desired shipment characteristics to the system and the system may use the desired shipment characteristics to select possible uncovered shipments to be matched with vehicles.

The system may track and evaluate available capacity that may be stationary and/or capacity that may not remain stationary but is available to pick up and transport a new uncovered shipment. The number of vehicles that are available to pick up new shipments in any geographical area (state, region, city, or radius from a city, etc.) is commonly referred to as "available capacity."

The system may automatically and continually determine a distance in miles between all uncovered shipments and all viable vehicles to transport the uncovered shipments. This allows the system to determine in real-time, an estimated time of arrival (ETA) for each vehicle to arrive at the location associated with the uncovered shipments. This may include uncovered shipments at a present time and a future time. Capacity with an ETA that is not able to arrive by a shipment scheduled pick up time or loading window time may not be considered viable capacity for the particular uncovered shipment and may be eliminated from possible consideration by the system.

FIG. 1 shows a block diagram of a computing system comprising a freight capacity system 100 according to an example embodiment. The freight capacity system 100 determines, estimates, and identifies freight capacity. As an example, the freight capacity system 100 may represent the transportation of cargo or freight that is being conveyed between locations for commercial gain by train, motor carrier, or a combination of train and motor carrier, e.g., intermodal transportation.

The freight capacity system 100 includes at least one server computing device 102 having a freight capacity application 114 that is in communication with at least one client computing device 104 and/or one or more of the client's shipping and receiving locations 109 and at least one motor carrier computing device 105 via a communication network 106. The server computing device 102 is also in communication with a plurality of vehicles 111, each vehicle 111 having a computing device and/or an associated computing device. Each vehicle 111 may be a tractor-trailer, a tractor without a trailer, a truck, or another type of vehicle. There are a plurality of vehicles 111 associated with the system 100 and a plurality of uncovered freight shipments 113 that may be at a plurality of origin pick up and destination receiving locations 109.

The freight capacity system 100 may also include a relational database management system (RDBMS) or another type of database management system that stores and communicates data from at least one database 112. The data stored in the at least one database 112 may be freight capacity information including shipment information for each uncovered shipment associated with the freight capacity system 100 (e.g., a shipment identifier, a pick up time and/or a pick up window for the shipment, a pick up location for the uncovered shipment), shipment information for each covered shipment associated with the freight capacity system 100 (e.g., a shipment identifier, a pick up time and/or a pick up window for the shipment, a pick up location for the covered shipment), vehicle information for each vehicle 111, operator information for each operator (e.g., a unique identifier for a computing device associated with the vehicle and/or a user id and a password), shipper information for each shipper (e.g., a unique identifier for the shipper and/or a user id and a password), third party representative information for each third party representative (e.g., a unique identifier for each third party representative and/or a user id and a password, among other data. One or more shippers may assign a $3^{rd}$ Party (e.g., a 3PL, Broker, Forwarder, or other) their responsibility to communicate the shipper's uncovered shipments to the system 100. As an example, the database 112 may include one or more tables or data structures that may be organized to store the information associated with the database 112.

The at least one server computing device 102 is configured to receive data from and/or transmit data to the at least one client computing device 104 and/or the one or more of the client's shipping and receiving locations 109 and at least one motor carrier computing device 105 and/or its vehicles 111 through the communication network 106. Although the at least one server computing device 102 is shown as a single server, it is contemplated that the at least one server computing device 102 may include multiple servers, for example, in a cloud computing configuration. Additionally, the at least one server computing device 102 is configured to receive data and/or transmit data to the at least one client computing device 104 through the communication network 106.

The communication network 106 can be the Internet, an intranet, or another wired or wireless communication network. For example, the communication network 110 may include a Mobile Communications (GSM) network, a code division multiple access (CDMA) network, $3^{rd}$ Generation Partnership Project (GPP) network, an Internet Protocol (IP) network, a wireless application protocol (WAP) network, a Wi-Fi network, a satellite communications network, or an IEEE 802.11 standards network, as well as various communications thereof. Other conventional and/or later developed wired and wireless networks may also be used.

The at least one server computing device 102 includes at least one processor 108 to process data and memory 110 to store data. The processor 108 processes communications, builds communications, retrieves data from memory 110, and stores data to memory 110. The processor 108 and the memory 110 are hardware. The memory 110 may include volatile and/or non-volatile memory, e.g., a computer-readable storage medium such as a cache, random access memory (RAM), read only memory (ROM), flash memory, or other memory to store data and/or computer-readable executable instructions such as a portion or component of the freight capacity application 114. In addition, the at least one server computing device 102 further includes at least one communications interface to transmit and receive communications, messages, and/or signals.

The at least one client computing device 104 and the motor carrier computing device 105 includes at least one processor 116 to process data and memory 118 to store data. The processor 116 processes communications, builds communications, retrieves data from memory 118, and stores data to memory 118. The processor 116 and the memory 118 are hardware. The memory 118 may include volatile and/or non-volatile memory, e.g., a computer-readable storage medium such as a cache, random access memory (RAM), read only memory (ROM), flash memory, or other memory to store data and/or computer-readable executable instructions such as a portion or a component of the freight capacity application 114 displayed and executed by a browser 124. In addition, the at least one client computing device 104 and the motor carrier computing device 105 further includes at least one communications interface to transmit and receive communications, messages, and/or signals.

The at least one client computing device 104 and the motor carrier computing device 105 can be a laptop computer, a smartphone, a personal digital assistant, a tablet computer, a standard personal computer, or another processing device. The at least one client computing device 104 may include a display 120, such as a computer monitor, for displaying data and/or graphical user interfaces. The at least one client computing device 104 and the motor carrier computing device 105 may also include an input device 122, such as a camera, a keyboard or a pointing device (e.g., a mouse, trackball, pen, or touch screen) to enter data into or interact with graphical and/or other types of user interfaces. In an exemplary embodiment, the display 120 and the input device 122 may be incorporated together as a touch screen of the smartphone or tablet computer.

The at least one client computing device 104 and the motor carrier computing device 105 may display on the display 120 a graphical user interface (or GUI) application to generate a graphical user interface on the display 120. The graphical user interface may be provided by the browser 124 and the freight capacity application 114, which may be transmitted from the server computing device 102. The graphical user interface enables a user of the at least one client computing device 104 and the motor carrier computing device 105 to interact with the at least one server computing device 102 and the freight capacity application 114.

The freight capacity application 114 may be a component of an application and/or service executable by the at least one client computing device 104 and/or the motor carrier computing device 105 and/or the at least one server computing device 102. For example, the freight capacity application 114 may be a single unit of deployable executable code or a plurality of units of deployable executable code. According to one aspect, the freight capacity application 114 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

As noted above, each vehicle 111 may include a computing device such as a mobile computing device. The computing device may be at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the freight capacity application 114. In addition, the computing device further may include a Global Positioning System (GPS) hardware device for determining a particular location of the vehicle 111, and at least one communications interface to transmit and receive communications, messages, and/or signals for determining a particular location of the vehicle 111 and other qualities that affect the vehicle's availability, viability, and score.

Figure 2:
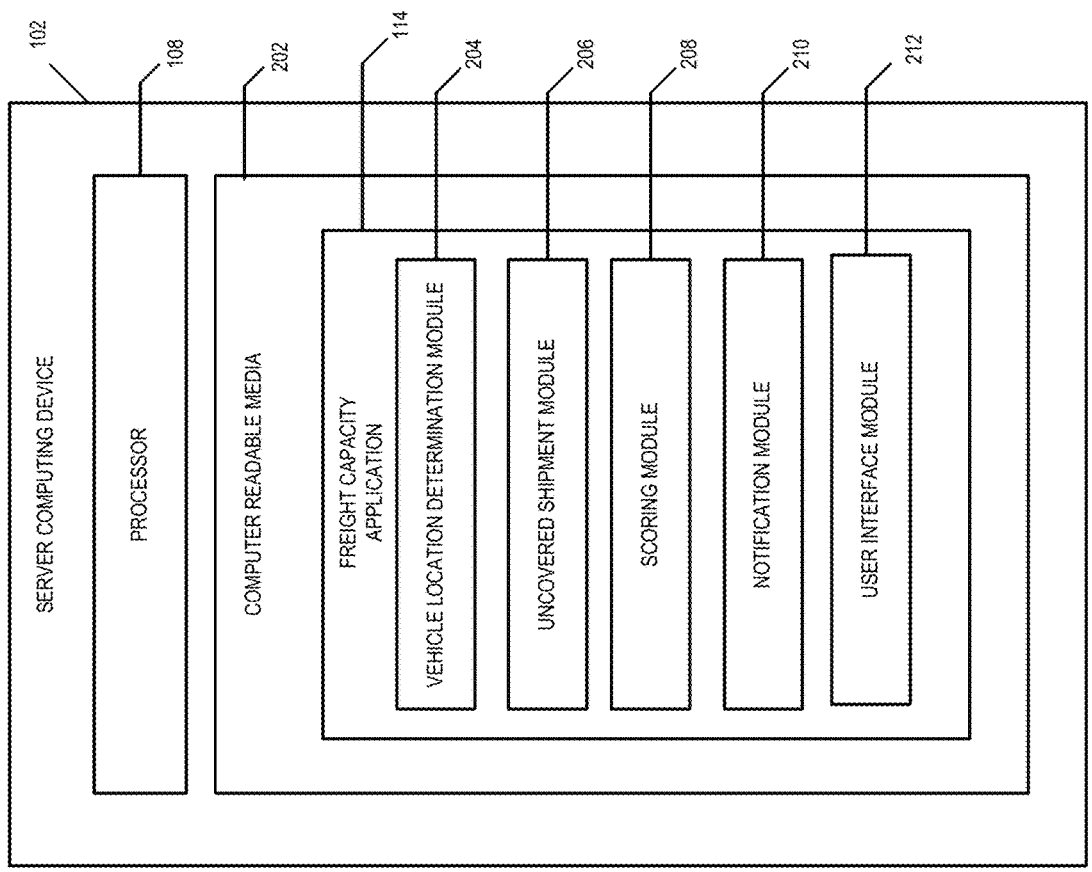
FIG. 2 shows a block diagram of a server computing device of the system according to an example embodiment.

FIG. 2 illustrates a block diagram of the server computing device 102 according to an example embodiment. The server computing device 102 includes computer readable media (CRM) 202 in memory on which the freight capacity application 114 or other user interface or application is stored. The computer readable media may include volatile media, nonvolatile media, removable media, non-removable media, and/or another available medium that can be accessed by the processor 108. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The freight capacity application 114 may include a vehicle location determination module 204 for determining a current location for each vehicle 111 of the plurality of vehicles. The current location may be a latitude/longitude for the vehicle. The vehicle location determination module 204 may retrieve the current known location for each vehicle 111 from the database 112. In addition, the vehicle location determination module 204 may request the location from each vehicle 111 by sending a request to the vehicle 111 and/or a computing device associated with the operator of the vehicle 111 or a computing device located in the vehicle 111.

The freight capacity application 114 may include an uncovered shipment module 206 for retrieving information from the database 112 regarding a plurality of uncovered shipments 113 associated with the system 100. This may include a location of each uncovered shipment of a plurality of uncovered shipments. The location may be a latitude/longitude for the uncovered shipment 113. The uncovered shipment module 206 may determine a distance (e.g., in miles) from each uncovered shipment 113 of the plurality of uncovered shipments to each vehicle 111 of the plurality of vehicles. In addition, the uncovered shipment module 206 may determine an estimated time of arrival (ETA) for each vehicle of the plurality of vehicles to each location associated with each uncovered shipment 113 of the plurality of uncovered shipments. In certain instances, the ETA may not be appropriate for the uncovered shipment 113 because it is after a desired pick up time or desired pick up time window for the uncovered shipment. In this case, the vehicle may be eliminated from being selected as a possibility for covering the uncovered shipment. The uncovered shipment module 206 also may retrieve one or more qualities of each uncovered shipment of the plurality of uncovered shipments. This may include the type of commodity, the perishable nature, the weight, the value, the hazardous nature, the expedited nature, and other qualities of the particular uncovered shipment of a plurality of shipments.

The freight capacity application 114 may further include a scoring module 208 for determining a score for each vehicle 111 of the plurality of vehicles for each uncovered shipment 113 of the plurality of uncovered shipments. As noted above, some vehicles may be marked as unable to be selected as a possibility for covering the uncovered shipment 113 and these vehicles may not be scored. The scoring module 208 may determine the score based on the distance of each vehicle 111 from each uncovered shipment 113, the ETA of each vehicle 111 to each uncovered shipment 113, a pick up time for the uncovered shipment 113, and other factors and variables such as vehicle/trailer suitability for the uncovered shipment. As noted herein, each vehicle 111 may be scored whether the vehicle is stationary or in transit. In addition, each vehicle 111 may be scored whether the vehicle is currently transporting a shipment of freight or not currently transporting a shipment of freight. The vehicle having a highest score may be selected to cover the uncovered shipment 113.

In addition, the scoring module 208 may determine a score for each uncovered shipment 113 of the plurality uncovered shipments for each available vehicle 111 of the plurality of available vehicles 111. Some uncovered shipments may be marked as unable to be selected as a possibility for being covered by a particular available vehicle 111 of the plurality of vehicles 111 and these vehicles may not be scored. The scoring module 208 may determine the score based on the distance of each vehicle 111 from each uncovered shipment 113, the ETA of each vehicle 111 to each uncovered shipment 113, a pick-up time for the uncovered shipment 113, and other factors and variables such as uncovered shipment suitability for the particular vehicle/trailer 111 of a plurality of vehicles/trailers. As noted herein, each uncovered shipment 113 may be scored whether the particular available vehicle 111 of the plurality of vehicles is in transit either currently transporting a shipment of freight or not currently transporting an already covered shipment of freight or deadheading. The uncovered shipment 113 of the plurality of uncovered shipments having a highest score may be selected to offer to be covered by a particular vehicle 111 of the plurality of vehicles.

The freight capacity application 114 may further include a notification module 210 for sending a notification to a computing device of an operator of the particular vehicle that indicates that the particular vehicle is selected to service the particular uncovered shipment. When an available vehicle 111 is selected and matched to cover an uncovered shipment, and the selected vehicle 111 accepts the offer to service the uncovered shipment, the no-longer-available vehicle is removed from the list of available vehicles that are available to service an uncovered shipment 113 for clients, shippers and/or their third-party representatives (e.g., freight brokers, freight forwarders). In addition, the status of the uncovered shipment selected and also confirmed as accepted to be serviced by an operator of a particular vehicle 111 is modified. The system 100 stores information in the database indicating that the shipment may not be available to be covered by vehicles 111 with available capacity. At this point, the freight capacity application 114 may remove the particular uncovered shipment from the plurality of uncovered shipments 113 by storing an indicator in the database 112. In addition, the freight capacity application may modify a status of the vehicle selected to cover the uncovered shipment 113 by storing the status of the vehicle 111 in the database 112.

The notification module 210 also may send a notification to a computing device of a client or third party that indicates that the particular vehicle 111 of a plurality of available vehicles is selected to be viable capacity to service the particular uncovered shipment. When an uncovered shipment 113 is selected and matched to be covered by an available and viable vehicle 111 and a client, and a shipper and/or a third-party representative (e.g., freight brokers, freight forwarders) approves the offer to be communicated, the selected vehicle or vehicles may accept the offer to service the uncovered shipment, and the no-longer uncovered shipment is removed from the list of uncovered shipments 113 that are available to be serviced by available vehicles 111. In addition, the status of the uncovered shipment selected and also confirmed as accepted to be serviced by an operator of a particular vehicle 111 is modified. The system 100 stores information in the database 112 indicating that the shipment may not be available to be covered by vehicles with available capacity. At this point, the freight capacity application 114 may remove the particular uncovered shipment from the plurality of uncovered shipments 113 by storing an indicator in the database 112. In addition, the freight capacity application 114 may modify a status of both the vehicle selected to cover the uncovered shipment 113 and the status of the uncovered shipment 113 by storing the status of the vehicle 111 and the status of the uncovered shipment 113 in the database 112.

In addition, the freight capacity application 114 includes a user interface module 212 for displaying a user interface on the display 120. As an example, the user interface module 212 generates a native and/or web-based graphical user interface (GUI) that accepts input and provides output viewed by users of the client computing device 104. The client computing device 104 may provide realtime automatically and dynamically refreshed freight capacity information. The user interface module 212 may send data to other modules of the freight capacity application 114 of the server computing device 102, and retrieve data from other modules of the freight capacity application of the server computing device 102 asynchronously without interfering with the display and behavior of the user interface displayed by the browser 124 of the client computing device 104.

Figure 3:
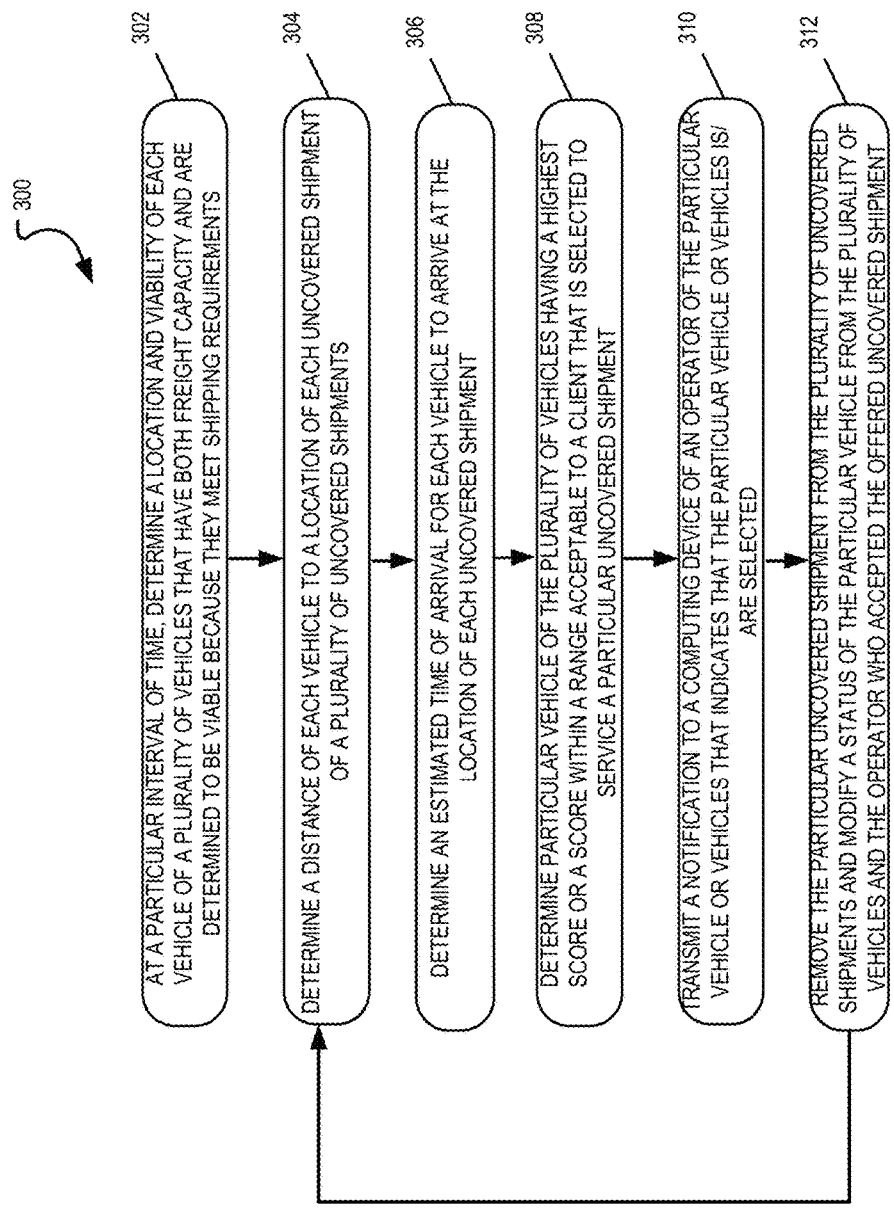
FIG. 3 illustrates a flowchart for automatically determining and identifying freight capacity according to an example embodiment.

FIG. 3 illustrates a flowchart of a process 300 for identifying freight capacity, according to an example embodiment. In step 302, at a particular interval of time, such as every five minutes, every fifteen minutes, every thirty minutes, and every sixty minutes, or another interval of time, the server computing device 102 may determine a location of each vehicle 111 of the plurality of vehicles that may have freight capacity. The particular interval of time may be set by a user of the client computing device 102. In one example, each vehicle may regularly report a location of the vehicle using a GPS device in the vehicle and/or a mobile computing device of the operator of the vehicle 111. The location also may be reported manually by the operator of the vehicle 111. Each vehicle 111 comprises one of a van type vehicle, a flatbed type vehicle, a tanker type vehicle, and a hopper type vehicle, or another type of vehicle.

Next, in step 304, the server computing device 102 may determine a distance of each vehicle 111 of the plurality of vehicles to a location of each uncovered shipment 113 of a plurality of uncovered shipments associated with the system 100. As an example, the distance from a particular vehicle to an uncovered shipment may be one hundred miles.

In step 306, the server computing device 102 may determine an estimated time of arrival for each vehicle 111 to arrive at the location of each uncovered shipment 113. As an example, the estimated time of arrival may be 17:00 on January 3. This estimated time of arrival may be used to determine whether the vehicle 111 is able to meet a pick up deadline or window of time for the uncovered shipment, e.g., 18:00 on January 3.

In step 308, the server computing device 102 may determine a particular vehicle 111 of the plurality of vehicles score so that each particular vehicle of the plurality of vehicles can be ranked and evaluated for selection to service a particular uncovered shipment. The system may determine a score for each vehicle and rank the vehicles based on the score. The system also may determine a score for each shipment and rank the shipments based on the score. A number of highest scoring vehicles and/or shipments may be automatically selected. This number may be greater than or equal to one. The score may be based at least on the distance of the particular vehicle to the particular uncovered shipment (e.g., one hundred miles), the estimated time of arrival to the location of the particular uncovered shipment (e.g., 17:00 on January 3), a pick up deadline or window of time for the uncovered shipment (e.g., 18:00 on January 3), and factors or variables associated with the vehicle (e.g., the vehicle includes refrigeration to service the particular shipment if it is perishable or does the driver of a particular vehicle maintain a USDOT Hazardous Materials endorsement if the particular shipment is a Hazardous Materials shipments required to be placarded as such, and other factors and variables). Shipment factors and variables may include the type of commodity being shipped and the nature of the commodity e.g., is the commodity hazardous and requiring a hazardous materials certified vehicle and driver, or is the shipment perishable requiring a vehicle with refrigeration, or does the shipment have a high monetary value requiring constant surveillance, and other variables.

In one example, the score may range from zero to one hundred. In another example, the score may range from 0% to 100%. In another example, the score may range from zero to one. In another example, the score may range from zero to ten. Other score ranges and rankings are possible. In addition to the score, the numbers of miles that each available and viable vehicle of a plurality of vehicles must travel to arrive at the physical location of the pick-up origin of each uncovered shipment of a plurality of shipments as calculated by the system 100 is an important part of each score. As an example, the greater the distance between a vehicle's current location and a particular shipment of a plurality of shipments pick up origin location makes the attractiveness of the particular uncovered shipment of a plurality of uncovered shipments less appealing to the operators of vehicles of a plurality of vehicles due to the added costs of a longer distance traveled. In another example, if the particular vehicle of the plurality of vehicles estimated time of arrival at the uncovered shipment's pick up origin is less than a certain number of hours prior to the shipment's scheduled pick-up deadline or window, as determined by the client, the vehicle's score may be worsened or the particular vehicle may be considered not viable.

In addition, at timed intervals when the system 100 re-evaluates all available vehicles and all uncovered shipments, certain conditions may have changed that cause previous scores to be improved or worsened and cause revised rankings of each particular vehicle of the plurality of vehicles and each particular uncovered shipment of the plurality of uncovered shipments and revise score rankings. Shipment qualities include the type of commodity being shipped and the nature of the commodity, e.g., is the commodity hazardous requiring a hazardous materials certified vehicle and driver, or is the shipment perishable requiring a vehicle with refrigeration, or does the shipment have a high monetary value requiring constant surveillance, and other qualities.

The score may be determined to be the highest score of the particular vehicle of the plurality of vehicles for one of a current time and a future time. The factors and the variables may further be based on shipment availability of each vehicle of the plurality of vehicles. In other words, although a particular vehicle may be located closest to the location of the particular shipment, the particular vehicle may be in transit to a destination with a shipment and currently unavailable.

In addition, the factors and the variables may be further based on operator availability of each vehicle of the plurality of vehicles and vehicle availability of each vehicle of the plurality of vehicles. In other words, the operator of the particular vehicle may have already have traveled the daily limit of hours and the operator may have to rest. Thus, the operator would be unavailable. In addition, it is possible that the vehicle may need to be serviced and the vehicle may be unavailable or the operator of a particular vehicle 111 may request a fee to service an uncovered shipment that exceeds the transportation service fee approved by the client. This high fee may reduce the vehicle's score and ranking in comparison to the scores of other available vehicles.

In step 310, the server computing device 102 may transmit a notification to each operator of a plurality of operators of available vehicles, and the score and ranking assigned to the vehicle to service each particular uncovered shipment of a plurality of shipments. At the discretion of the client, the server computing device 102 may transmit a notification to a particular vehicle and/or a client computing device associated with the vehicle that indicates that the particular vehicle is selected to service the particular uncovered shipment. The notification may indicate that the particular vehicle is selected to service the particular uncovered shipment. The notification may be sent to a computer device of the vehicle and/or may be sent to a computing device associated with the vehicle or the operator of the vehicle. Alternatively, the notification may be sent to a third party that is assisting the operator and/or in communication with the operator.

At step 312, the server computing device 102 may remove the particular uncovered shipment from the plurality of uncovered shipments by storing information in the database 112 and modifying a status of the particular vehicle from the plurality of vehicles. As an example, the particular vehicle will show that it is carrying the freight associated with the particular uncovered shipment and may be unavailable to service future uncovered shipments.

After the particular uncovered shipment is removed from the plurality of uncovered shipments, the process 300 may proceed back to step 304 and continue to process steps 304-312 to select particular vehicles to service particular uncovered shipments by selecting vehicles having a highest score or in some instances selecting a group of available and viable vehicles having scores that exceed the client's minimum range to qualify to be offered an uncovered shipment. When the next particular interval of time occurs, the process may proceed back to step 302 to re-determine the location of each vehicle of the plurality of vehicles having freight capacity. At that point, the process may continue to process steps 304-312 until the next particular interval of time.

At a next interval of time, the server computing device 102 may rescore each of the vehicles for each of the uncovered shipments and reassign vehicles to the uncovered shipments based on the new scores. The scores may change based on movement of the plurality of vehicles and/or other factors and variables.

The server computing device 102 may continually evaluate and determine available capacity that is ready to pick up a shipment at a present time and also may evaluate capacity available to pick up a shipment at a future time.

Figure 4:
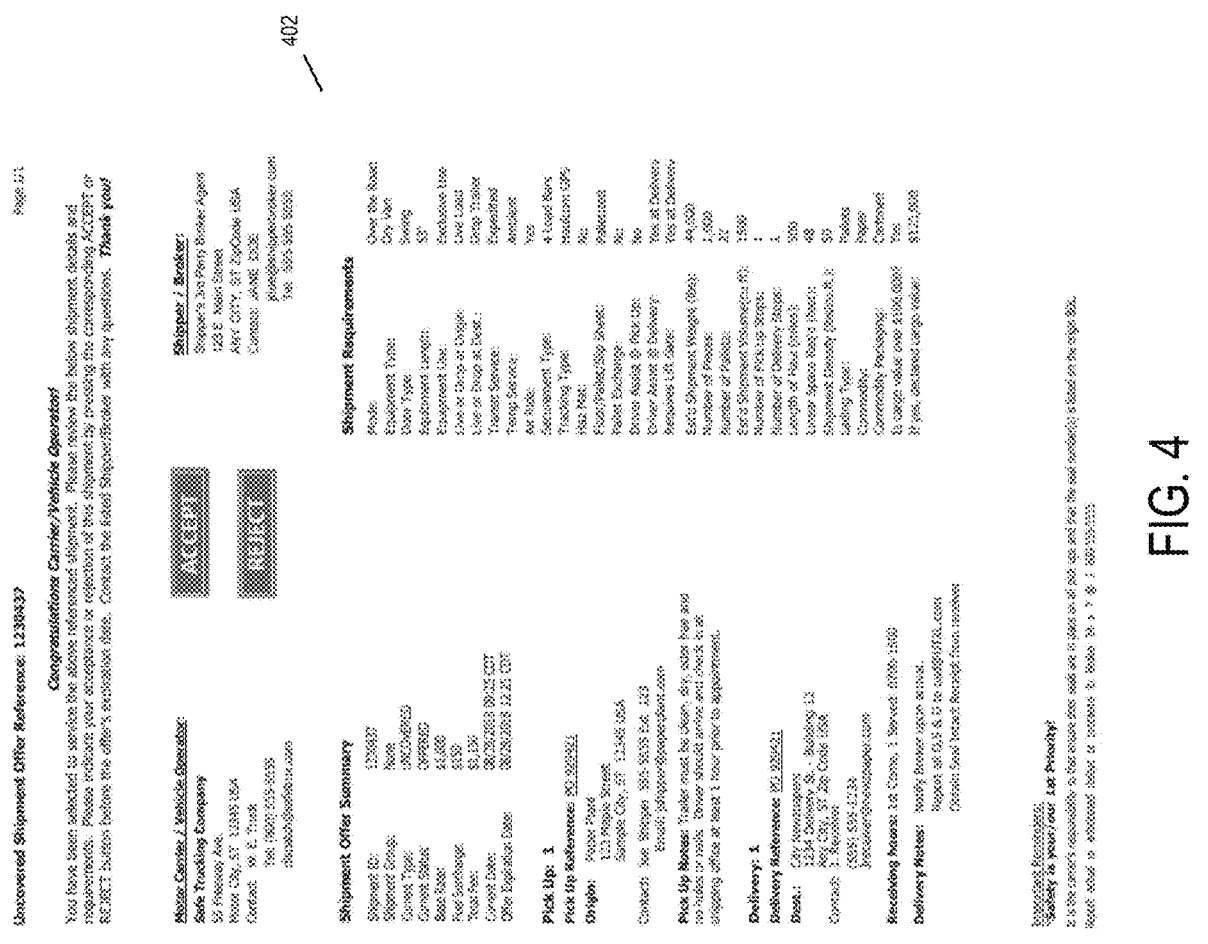

FIG. 4 shows an example of a notification 402 that may be sent to a computing device associated with a particular vehicle selected to service a particular uncovered shipment. FIG. 4 shows an uncovered shipment offer reference number 1230437 that provides shipment details and requirements. In addition, FIG. 4 shows two buttons or user interface elements that each respectively allows acceptance or rejection of the offer.

FIG. 4 shows a motor carrier/vehicle operator of Safe Trucking Company and a shipper/broker. In addition, FIG. 4 shows a shipment offer summary including a shipment ID, a shipment group, a current type, a current status, a base rate, a fuel surcharge, a total fee, a current date, and an offer expiration date. FIG. 4 also shows pick up information including a pick up reference number (e.g., PO 929421), an origin (e.g., Paper Plant), contact information, and pick up notes. FIG. 4 further shows delivery information including a delivery reference number (e.g., PO 929421), a destination (e.g., City Newzpapers), and a destination contact. FIG. 4 additionally shows shipment requirements associated with the shipment.

Figure 5:
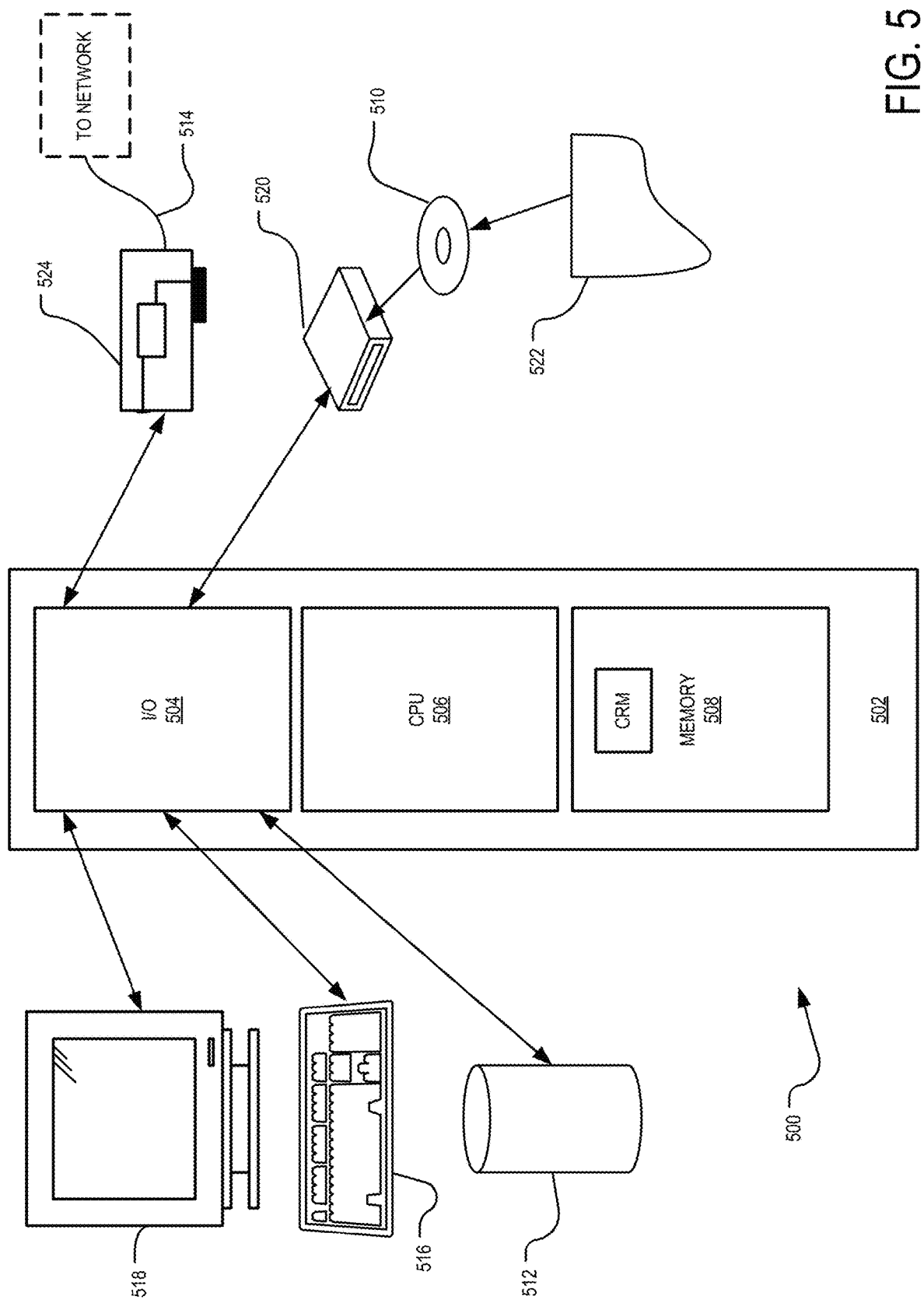
FIG. 5 illustrates a block diagram of a computing device according to an example embodiment.

FIG. 5 illustrates an example computing system 500 that may implement various systems, such as the server computing device 102, the client computing device 104, the motor carrier computing device 105, the vehicle computing device, the computing device associated with the vehicle, and the methods discussed herein, such as process 300. A general purpose computer system 500 is capable of executing a computer program product to execute a computer process. Data and program files may be input to the computer system 500, which reads the files and executes the programs therein such as the freight capacity application 114 and the browser 124. Some of the elements of a general purpose computer system 500 are shown in FIG. 5 wherein a processor 502 is shown having an input/output (I/O) section 504, a central processing unit (CPU) 506, and a memory section 508. There may be one or more processors 502, such that the processor 502 of the computer system 500 comprises a single central-processing unit 506, or a plurality of processing units, commonly referred to as a parallel processing environment. The computer system 500 may be a conventional computer, a server, a distributed computer, or any other type of computer, such as one or more external computers made available via a cloud computing architecture. The presently described technology is optionally implemented in software devices loaded in memory 508, stored on a configured DVD/CD-ROM 510 or storage unit 512, and/or communicated via a wired or wireless network link 514, thereby transforming the computer system 500 in FIG. 5 to a special purpose machine for implementing the described operations.

The memory section 508 may be volatile media, nonvolatile media, removable media, non-removable media, and/or other media or mediums that can be accessed by a general purpose or special purpose computing device. For example, the memory section 508 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 504 is connected to one or more user-interface devices (e.g., a keyboard 516 and a display unit 518), a disc storage unit 512, and a disc drive unit 520. Generally, the disc drive unit 520 is a DVD/CD-ROM drive unit capable of reading the DVD/CD-ROM medium 510, which typically contains programs and data 522. Computer program products containing mechanisms to effectuate the systems and methods in accordance with the presently described technology may reside in the memory section 504, on a disc storage unit 512, on the DVD/CD-ROM medium 510 of the computer system 500, or on external storage devices made available via a cloud computing architecture with such computer program products, including one or more database management products, web server products, application server products, and/or other additional software components. Alternatively, a disc drive unit 520 may be replaced or supplemented by a tape drive unit, or other storage medium drive unit. The network adapter 524 is capable of connecting the computer system 500 to a network via the network link 514, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 500 is connected (by wired connection and/or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are examples of communications devices for and other means of establishing a communications link between the computers may be used.

In an example implementation, source code executed by the server computing device 102, the client computing device 104, the motor carrier computing device 105, or the vehicle computing device, a plurality of internal and external databases, source databases, and/or cached data on servers are stored in the database 112, memory 110 of the server computing device 102, memory 118 of the client computing device 104, memory of the motor carrier computing device 105, memory of the vehicle computing device, or other storage systems, such as the disk storage unit 512 or the DVD/CD-ROM medium 510, and/or other external storage devices made available and accessible via a network architecture. The source code executed by the server computing device 102 and the client computing device 104 may be embodied by instructions stored on such storage systems and executed by the processor 502.

Some or all of the operations described herein may be performed by the processor 502, which is hardware. Further, local computing systems, remote data sources and/or services, and other associated logic represent firmware, hardware, and/or software configured to control operations of the freight capacity system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 502 and a user may interact with a Graphical User Interface (GUI) using one or more user-interface devices (e.g., the keyboard 516, the display unit 518, and the user devices 504) with some of the data in use directly coming from online sources and data stores. The system set forth in FIG. 5 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
   a central server computing device comprising a memory, the central server connected via a network to a plurality of vehicle computing devices; and
   at least one processor to:
      at a particular regular interval of time, transmit by the central server computing device via the network a request for a location to a global positioning device (GPS) in a vehicle computing device of each vehicle of a plurality of vehicles, receive a response over the network from the GPS from each vehicle of the plurality of vehicles, and determine the location of each vehicle of the plurality of vehicles that have freight capacity;
      determine, by the central server computing device, a distance of each vehicle to a location of each uncovered shipment of a plurality of uncovered shipments, each uncovered shipment having a unique identifier that represents the uncovered shipment;

determine, by the central server computing device, an estimated time of arrival for each vehicle to arrive at the location of each uncovered shipment of the plurality of uncovered shipments;

continually score, by the central server computing device, each vehicle of the plurality of vehicles at the particular regular interval of time and determine a particular vehicle of the plurality of vehicles having a highest score that is selected to service a particular uncovered shipment of the plurality of uncovered shipments, the highest score based on the distance, the estimated time of arrival, a pick up time for the particular uncovered shipment, a type of commodity of the uncovered shipment, historical information associated with each vehicle of the plurality of vehicles, traffic information, and weather information;

query, by the central server computing device, a database for a unique identifier that represents a particular vehicle computing device located in the particular vehicle having the highest score that is selected to service the particular uncovered shipment;

using the unique identifier that represents the particular vehicle computing device located in the particular vehicle having the highest score, transmit over the network by the central server computing device a notification to the particular vehicle computing device of the particular vehicle that indicates that the particular vehicle is selected to service the particular uncovered shipment and receive a response over the network indicating acceptance to service the particular uncovered shipment from input received by a touch screen user interface element displayed by the vehicle computing device; and remove, by the central server computing device, the particular uncovered shipment from the plurality of uncovered shipments and modify a status of the particular vehicle from the plurality of vehicles in the database using the unique identifier that represents the particular vehicle computing device located in the particular vehicle and using the unique identifier that represents the particular uncovered shipment.

2. The system of claim 1, wherein the particular regular interval of time comprises one of every five minutes, every fifteen minutes, every thirty minutes, and every sixty minutes.

3. The system of claim 1, wherein each vehicle comprises one of a van type vehicle, a flatbed type vehicle, a tanker type vehicle, and a hopper type vehicle.

4. The system of claim 1, the at least one processor further to determine the highest score of the particular vehicle of the plurality of vehicles for one of a current time and a future time.

5. The system of claim 1, the at least one processor further to determine shipment availability of each vehicle of the plurality of vehicles.

6. The system of claim 1, the at least one processor further to determine operator availability of each vehicle of the plurality of vehicles.

7. A method comprising:
at a particular regular interval of time, transmitting via a network, by at least one processor of a central server computing device, a request for a location to a global positioning device (GPS) in a vehicle computing device of each vehicle of a plurality of vehicles, receive a response from the GPS from each vehicle of the plurality of vehicles, and determining, by the at least one processor, the location of each vehicle of the plurality of vehicles that have freight capacity;

determining, by the at least one processor of the central server computing device, a distance of each vehicle to a location of each uncovered shipment of a plurality of uncovered shipments, each uncovered shipment having a unique identifier that represents the uncovered shipment;

determining, by the at least one processor of the central server computing device, an estimated time of arrival for each vehicle to arrive at the location of each uncovered shipment of the plurality of uncovered shipments;

continually scoring each vehicle of the plurality of vehicles at the particular regular interval of time and determining, by the at least one processor of the central server computing device, a particular vehicle of the plurality of vehicles having a highest score that is selected to service a particular uncovered shipment of the plurality of uncovered shipments, the highest score based on the distance, the estimated time of arrival, a pick up time for the particular uncovered shipment, a type of commodity of the uncovered shipment, historical information associated with each vehicle of the plurality of vehicles, traffic information, and weather information;

querying, by the at least one processor of the central server computing device, a database for a unique identifier that represents a particular vehicle computing device located in the particular vehicle having the highest score that is selected to service the particular uncovered shipment;

using the unique identifier that represents the particular vehicle computing device located in the particular vehicle having the highest score, transmitting, over the network by the at least one processor of the central server computing device, a notification to the particular vehicle computing device of the particular vehicle that indicates that the particular vehicle is selected to service the particular uncovered shipment and receive a response over the network indicating acceptance to service the particular uncovered shipment from input received by a touch screen user interface element displayed by the vehicle computing device; and removing, by the at least one processor of the central server computing device, the particular uncovered shipment from the plurality of uncovered shipments and modifying a status of the particular vehicle from the plurality of vehicles in the database using the unique identifier that represents the particular vehicle computing device located in the particular vehicle and using the unique identifier that represents the particular uncovered shipment.

8. The method of claim 7, wherein the particular regular interval of time comprises one of every five minutes, every fifteen minutes, every thirty minutes, and every sixty minutes.

9. The method of claim 7, wherein each vehicle comprises one of a van type vehicle, a flatbed type vehicle, a tanker type vehicle, and a hopper type vehicle.

10. The method of claim 7, further comprising determining the highest score of the particular vehicle of the plurality of vehicles for one of a current time and a future time.

11. The method of claim 7, further comprising determining shipment availability of each vehicle of the plurality of vehicles.

12. The method of claim 7, further comprising determining operator availability of each vehicle of the plurality of vehicles.

13. A non-transitory computer-readable storage medium, having instructions stored thereon that, when executed by a computing device cause the computing device to perform operations, the operations comprising:

at a particular regular interval of time, transmitting via a network, by a central server computing device, a request for a location to a global positioning device (GPS) in a vehicle computing device of each vehicle of a plurality of vehicles, receive a response from the GPS from each vehicle of the plurality of vehicles, and determining the location of each vehicle of the plurality of vehicles that have freight capacity;

determining, by the central server computing device, a distance of each vehicle to a location of each uncovered shipment of a plurality of uncovered shipments, each uncovered shipment having a unique identifier that represents the uncovered shipment;

continually scoring, by the central server computing device, each vehicle of the plurality of vehicles at the particular regular interval of time and determining an estimated time of arrival for each vehicle to arrive at the location of each uncovered shipment of the plurality of uncovered shipments;

determining, by the central server computing device, a particular vehicle of the plurality of vehicles having a highest score that is selected to service a particular uncovered shipment of the plurality of uncovered shipments, the highest score based on the distance, the estimated time of arrival, a pick up time for the particular uncovered shipment, a type of commodity of the uncovered shipment, historical information associated with each vehicle of the plurality of vehicles, traffic information, and weather information;

querying, by the central server computing device, a database for a unique identifier that represents a particular vehicle computing device located in the particular vehicle having the highest score that is selected to service the particular uncovered shipment;

using the unique identifier that represents the particular vehicle computing device located in the particular vehicle having the highest score, transmitting over the network, by the central server computing device, a notification to the particular vehicle computing device of the particular vehicle that indicates that the particular vehicle is selected to service the particular uncovered shipment and receive a response over the network indicating acceptance to service the particular uncovered shipment from input received by a touch screen user interface element displayed by the vehicle computing device; and removing, by the central server computing device, the particular uncovered shipment from the plurality of uncovered shipments and modifying a status of the particular vehicle from the plurality of vehicles in the database using the unique identifier that represents the particular vehicle computing device located in the particular vehicle and using the unique identifier that represents the particular uncovered shipment.

14. The non-transitory computer-readable storage medium of claim 13, wherein the particular regular interval of time comprises one of every five minutes, every fifteen minutes, every thirty minutes, and every sixty minutes.

15. The non-transitory computer-readable storage medium of claim 13, wherein each vehicle comprises one of a van type vehicle, a flatbed type vehicle, a tanker type vehicle, and a hopper type vehicle.

16. The non-transitory computer-readable storage medium of claim 13, the operations further comprising determining the highest score of the particular vehicle of the plurality of vehicles for one of a current time and a future time.

17. The non-transitory computer-readable storage medium of claim 13, the operations further comprising determining shipment availability of each vehicle of the plurality of vehicles.

18. The non-transitory computer-readable storage medium of claim 13, the operations further comprising determining operator availability of each vehicle of the plurality of vehicles.

* * * * *